Sept. 29, 1953  J. B. POLOMSKI, JR  2,653,692
SELF-CENTERING CLUTCH DISK
Filed March 7, 1950  2 Sheets-Sheet 2

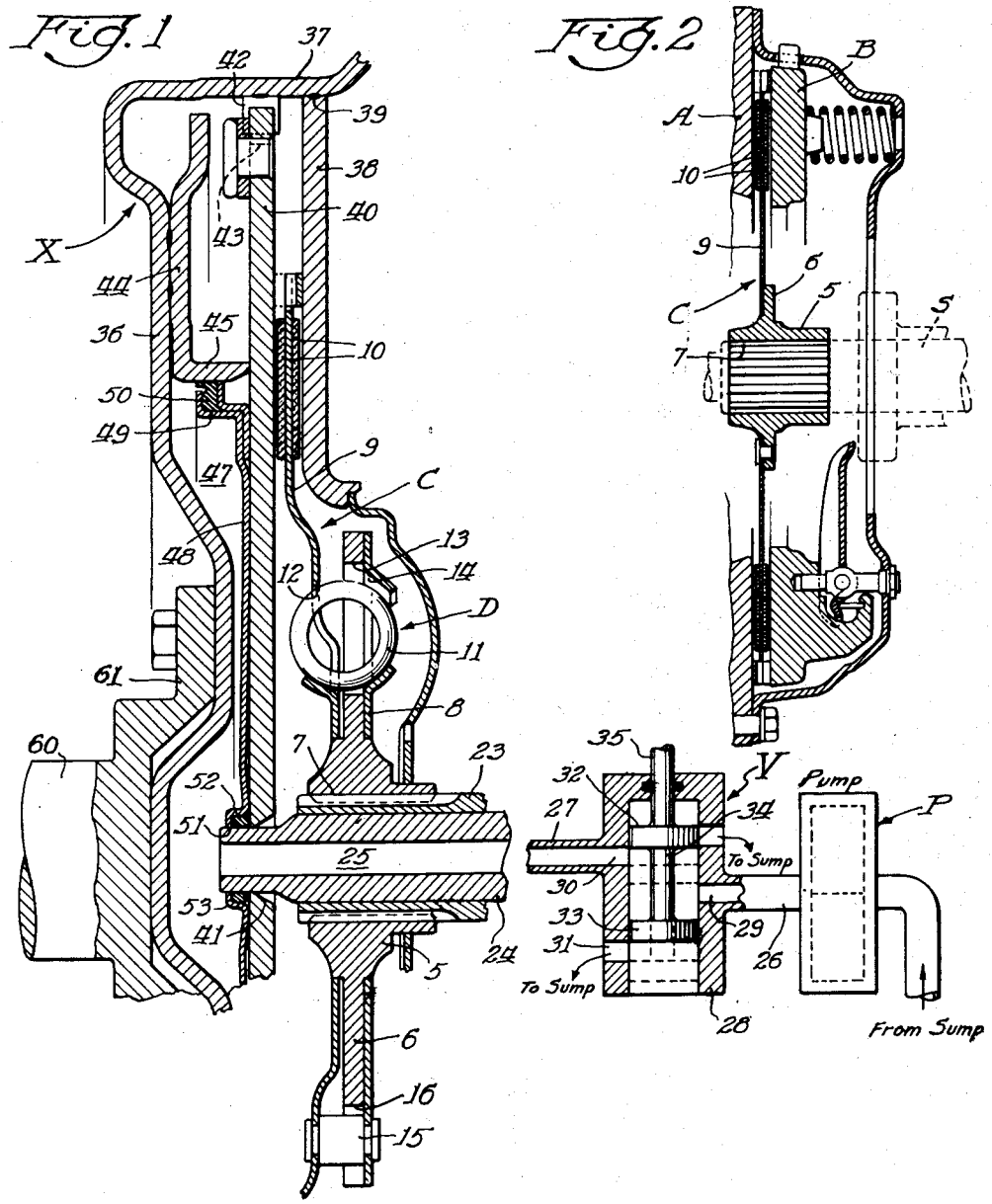

Inventor:
John Polomski, Jr.
By
Atty.

Patented Sept. 29, 1953

2,653,692

UNITED STATES PATENT OFFICE 2,653,692

SELF-CENTERING CLUTCH DISK

John B. Polomski, Jr., Detroit, Mich., assignor to Borg-Warner Corporation, Chicago, Ill., a corporation of Illinois Application March 7, 1950, Serial No. 148,165

4 Claims. (Cl. 192—68)

The present invention relates generally to improvements in driven friction plates or discs for use in clutch assemblies which drivingly connect the engine crank shaft to the transmission gears used in automotive vehicles.

It has been found that when the drive between the clutch assembly and certain types of transmissions is in a released position while the transmission gears are engaged in one of the speed ratios (such as low, second or reverse speed) the driven disc of the clutch assembly has a tendency to axially shift or creep toward and to come into contact with one or both of the clutch driving members, which usually is the rotating pressure plate of the clutch assembly. On account of the speed differential between the driven disc and the driving clutch members, the torque losses which are the result of friction between these members are of a considerable moment.

To overcome these above-stated torque losses due to friction, it is contemplated herein to employ the present self-centering clutch disc which is provided with means for maintaining the work surfaces of the said disc out of contact with either or both the flywheel surface and the pressure plate surface.

In its broadest aspect the means which are proposed by the present invention for centering the clutch driven disc may take the form of structures projecting beyond the plane of the work or friction surface of one of the clutch assembly members for contacting the opposing surface of another clutch assembly member to forcibly disengage said surfaces by effecting relative movement of the respective clutch members away from each other when the clutch engaging means is rendered inoperative. These disengaging structures have the characteristic of resiliency and compressibility in that they produce forces which are effective to disengage the clutch members at such time when the clutch engaging means is inoperative and not effective to force the clutch members towards each other.

Merely for the purpose of simplicity, one type of these disengaging structures is herein shown as comprising suitably shaped lips which are formed in the outer region of the intermediate plate or other friction facing supporting means and lying preferably between the inner and outer peripheries of such facings. In order to accommodate these lips, the friction facing material is cut away for approximately the full length of the lips. Such lips are of a character and are so positioned that they will hold the facing members away from the flywheel or pressure plate, or both. The lips preferably have deformed or bowed regions projecting axially beyond the planes of the work surfaces of the friction facing members, and they are adapted to be compressed or collapsed when the clutch assembly is engaged to allow full pressure contact between the coupling members of the clutch.

While the present arrangement is of simple construction, it nonetheless is extremely effective in preventing torque losses during the release of the clutch assembly while the transmission is not in a neutral position, namely, when it is engaged in one of its gear ratios.

Additional objects, aims and advantages of the invention contemplated herein will be apparent to persons skilled in the art after the construction and arrangement of the self-centering clutch disc is understood from the within description. It is preferred to accomplish the numerous objects hereof and to practice the invention in substantially the manner hereinafter fully described and as more particularly pointed out in the appended claims. Reference is now made to the accompanying drawings which form a part of this specification.

In the drawings:

Fig. 1 is a fragmentary axial section illustrating an hydraulically operated clutch for automatic transmissions, and in which the present improvements are incorporated;

Fig. 2 is a sectional view, similar to Fig. 1, showing the present improvements in a typical mechanically operated friction clutch assembly;

The drawings are to be understood as being more or less of a diagrammatic character for the purpose of disclosing a typical or preferred embodiment of the improvements contemplated herein, and in these drawings the same reference characters identify like parts in the different views.

Figure 3:
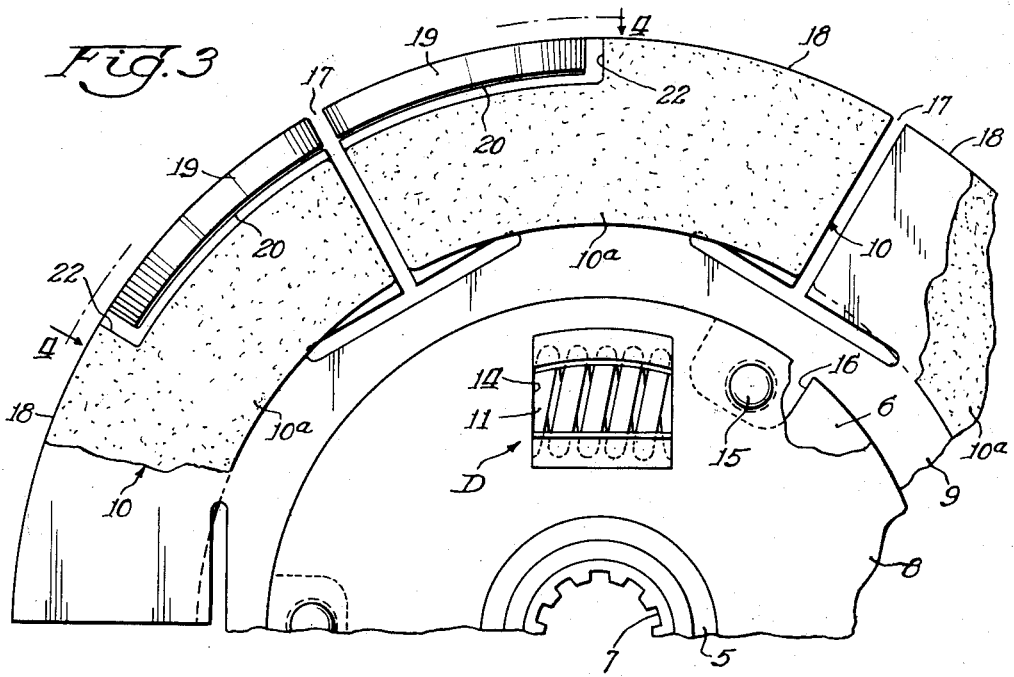
Fig. 3 is a fragmentary view in side elevation and partly broken away showing a friction clutch driven disc, embodying the present improvements, the disc being removed from the assembly.

In the embodiment of the invention disclosed herein the clutch driven disc preferably comprises a central hub 5 having thereon a radial flange 6, said hub also having therein a splined bore 7 whereby the clutch driven disc may be drivingly and slidably mounted on a rotatable driven shaft S which transmits torque to the system of transmission gearing for driving a motor vehicle. At one side of the hub flange 6 there is a washer-like plate member 8 which extends outwardly from the body of the hub to adjacent the outer periphery of the hub flange 6. At the opposite side of the hub flange there is a sheet metal plate or disc 9 extending radially outward from the hub beyond the outer periphery of flange 6 and at its outer region has friction facing material 10 secured to one or both of its sides.

While it is not essential in carrying out the present improvements, the driven clutch disc may have therein a vibration dampener assembly which is identified generally as D. Vibration dampener D is shown to comprise an annular row or series of coiled springs 11 which are seated under compression in openings or recesses 12, 13 and 14 made respectively in the disc 9, the hub flange 6 and the washer 8. The respective openings or recesses register with each other in axial alignment. The disc 9 and washer 8 are connected to each other by spacer rivets or spools 15, the barrels of which are located in circumferentially elongate shallow notches 16 extending radially inwardly from the periphery of the hub flange 6. Thus the disc and washer are spaced from each other a proper distance and they are tied together for simultaneous rotative movement. The circumferential dimensions of the notches 16 are such that the disc and washer may have limited rotative movement independently of the hub flange by compression of the springs 11 in the usual well-known manner.

Figure 5:
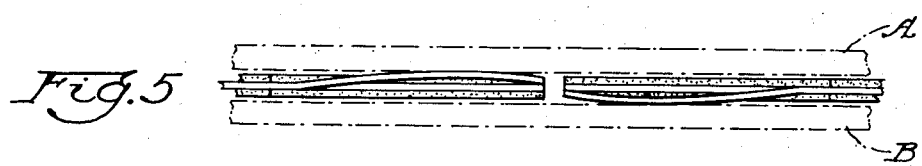
Fig. 5 is a fragmentary edge view of the clutch driven disc between two driving clutch members showing the parts in positions when the clutch assembly is released.
Figure 6:
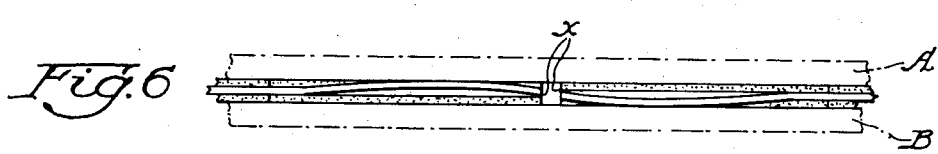
Fig. 6 is a view similar to Fig. 5 showing the parts in positions during clutch engagement.

The present improvements are directed to means for forcibly disengaging the driven clutch member or friction carrying plate from either or both of the driving members of a clutch assembly, which latter members are herein typified in Fig. 2 by a rotatable flywheel member A and an opposing axially shiftable pressure plate member B, both of which drive members have friction surfaces for engaging the exposed or work surfaces of the friction facings 10 of the clutch driven plate, such members A and B being schematically shown in Figs. 5 and 6 of the drawing. These improvements also prevent the clutch driven plate from shifting or creeping toward either of the clutch driving members when the clutch is disengaged while the transmission gears are still in mesh, and they are adapted to be collapsed under clutch packing pressures when the clutch is engaged.

As disclosed, the facing-carrying plate or disc 9 is radially slotted as at 17, the said slots being preferably of T-shape with the stems extending inwardly from the outer periphery of the metal disc and preferably terminate at their inner ends inwardly of the inner peripheries of the facing members 10, thus dividing the outer region of the plate or disc into a plurality of segments 18. The facing material 10, in the present instance, are not continuous annular members but are made up of a plurality of segments 10a, each of an arcuate length corresponding to the arcuate length of the disc segments 18 and extending from the radial portion of a slot 17 to the radial portion of the next slot. Any suitable means may be utilized for securely attaching these friction facing segments 10a to the disc segments 18.

Figure 4:
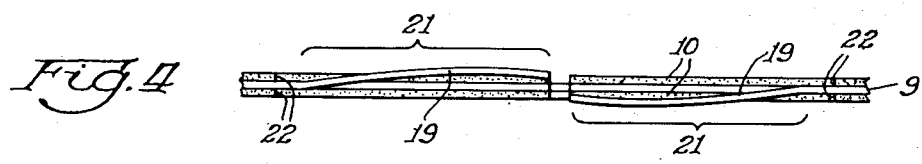
Fig. 4 is an edge view of the driven disc as seen along the plane of line 4—4 on Fig. 3.

A plurality of yieldable lips 19, made in the adjacent disc segments 18, are arranged circumferentially of said disc 9 at or adjacent the outer peripheral region thereof. These lips are made by cutting circumferential slits 20 in opposite directions from certain of the slots 17. Between their ends these lips are deformed in the direction of the thickness of the metal by providing therein preformed arcuately curved or bowed regions 21 to impart resiliency and compressibility thereto whereby said lips are effective to create forces sufficient to disengage the driven disc from the driving members of the clutch assembly upon release of the power means which effect the engagement of the clutch assembly. By reference to Fig. 2 and the enlarged views, Figs. 4, 5 and 6, it is seen that the deformed or bowed regions of the lips protrude beyond the planes of the exposed or work surfaces of the facing material on the clutch driven disc when the clutch assembly has been disengaged by the separation of the driving members. Since the bowed lips project beyond the work surface of the friction material, it is apparent that the driven disc will be approximately centered between the faces of the driving members when the clutch is disengaged, and also prevent any tendency for the disengaged driven plate to creep, toward the pressure plate B or toward the flywheel A, by reason of the contact of deformed lips with either or both of these driving members of the assembly. The above-mentioned Figs. 2, 4, 5 and 6, also show that the two tongues 19 at the sides of slot 17 in the disc 9 comprise a pair arranged circumferentially in end to end order so that they point in opposite directions thus defining yieldable members disposed respectively in trailing and leading positions with regard to either direction in which the driven friction clutch disc may be rotating. Furthermore, the tips of the pair of tongues are turned inward towards the plane of the disc (Fig. 4) so that these tips do not present edges that might have a tendency to cut or score the adjacent smooth surfaces of the flywheel member and pressure plate member between which the friction driven disc is positioned in a self-centering manner.

In order to accommodate the bowed lips 19, the respective friction facing segments 10 are recessed or notched by cutting away portions as at 22 throughout approximately the length of the respective adjacent lips. The lips 19 are preferably arranged in pairs as shown in Fig. 3, one on each side of radial slot 17, so that the lips of each pair extend toward each other from about midway the length of proximate disc segments. Also, these preformed bowed regions of the respective lips of a pair project axially in opposite directions to contact the respective clutch driving members A and B when the clutch assembly has been disengaged, as shown in Fig. 5. However, when pressure plate member B is moved axially to engage the driven disc with the flywheel face, the lips will yield and tend to flatten into collapsed positions as illustrated in Fig. 6, wherein it will be seen that the free ends of such lips will not come into contact with the facing member opposite the lip because of the tolerance $x$ between the lip ends and the opposite facing. This collapsing of the lips stores forces in them which are effective to disengage the several members of the clutch assembly when the clutch engaging means become inactive.

The principles of the hereinbefore described centering means for clutch driven plates is well adapted for a clutch assembly utilizing hydraulic or similar pressure for moving the clutch members into engagement, as for example in connection with automatic transmissions in which there are one or more pump devices driven by a rotating part or parts of a vehicle driving mechanism or other rotatable element. Such hydraulically operated clutch arrangement is shown in detail in Fig. 1, and will now be described.

The clutch driven disc in the hydraulically operated clutch assembly is structurally substantially the same as described hereinbefore and is identified generally in Fig. 1 by the character C. The splined hub 5 is slidably carried by the splined end region of a driven transmission quill or sleeve shaft 23 connected to the gearing of one of the speed ratios of an automatic transmission (not shown), said sleeve being journaled for rotation on a driven shaft 24 which in turn is connected to the gearing of another of the speed ratios of such transmission. Driven shaft 24 at its forward end projects beyond the adjacent end of sleeve shaft 23 and is piloted in the axial portion of a member forming a portion of a flywheel assembly X later to be described. A bore 25 extends through the forward end of shaft 24, and a remote portion of said bore communicates with a source of fluid pressure in the form of a pump P. A conduit 26 leads from the pump to a selector control valve assembly, shown schematically in section at V in Fig. 1, and a conduit 27 leads from said valve to the bore 25 of shaft 24. This selector valve assembly may comprise a cylindrical casing 28 which has a plurality of ports defining an inlet port 29 communicating with the pressure side of pump P; an outlet port 30 discharging into conduit 27; and an evacuating port 31 adapted to dump into an oil sump in the transmission housing. The reciprocable valve body may be of the spool type comprising a first head 32, controlling outlet port 30, and a second head 33, centrally evacuating port 31, these heads being connected by a bar 34 for simultaneous movement of said heads. A stem 35 projects out of casing 28 to be operated by any means for moving the valve body to either of two positions. As shown in full lines the valve body is positioned to open outlet port 30 and close evacuating port 31. When moved to its second position, shown in dotted lines, outlet port 30 is closed and pressure fluid from the pump passes out of the casing through the then opened evacuating port 31 to dump the fluid into the sump. When valve V is set to open port 30 pressure fluid passes through bore 25 of the shaft to energize the means which actuate the clutch assembly and effect engagement of the clutch members and couple shaft 24 to the prime mover or engine of the motor driven vehicle.

In Fig. 1 there is illustrated a mechanism for hydraulically effecting clutch engagement to provide a driving connection between the rotatable engine crank shaft 60 and rotatable driven shaft 24. As shown, crank shaft 60 has a radial flange 61 to which a rotatable flywheel assembly X is attached in any suitable manner. This particular flywheel assembly comprises a dished metal plate 36 having an axial flange 37 to which a back-plate 38 is secured in any suitable manner as by welding 39, and said dished plate 36 has its radial body portion removably attached to the crank shaft flange 61 by bolts, screws or the like to permit removal when desired. This back-plate 38 of the flywheel assembly provides an abutment against which the driven clutch disc is urged by an axially movable pressure plate 40 having a central aperture 41 which receives and pilots the adjacent end of driven transmission shaft 25. A driving connection between pressure plate 40 and the axial flange 37 of the dished flywheel plate by means of lugs 42, on the inner surface of flange 37, which are received in notches 43 made in the edge of pressure plate 40. An annulus of L-section is secured to and carried by the radial portion of dished plate 36, said annulus being arranged with its radial flange 44 flat against plate 36 and with its axial flange 45 projecting rearward towards pressure plate 40. The means which urge pressure plate 40 rearwardly to engage the clutch driven disc with the back-plate 38 comprises suitable piston means operative in the annular pressure chamber or cylinder 47 which is defined by the axial flange 45 of the annulus and by the intermediate central region of dished plate 36, such chamber 47 receiving the pressure discharged thereinto from the bore 25 of transmission driven shaft 24. The before-mentioned piston comprises a flexible metallic diaphragm 48 of disc-like form which has a diameter to fit within the chamber 47 with its outer periphery close to flange 45 of the L-shape annulus and has a channel 49 in its periphery to receive an elastic seal ring or gasket 50 to provide a leak-proof seal preventing the escape of pressure fluid between the diaphragm piston 48 and the axial flange 45 during actuation of the pressure plate 40. The axial region of the diaphragm plate 48 has an aperture 51 through which the reduced end of transmission driven shaft protrudes, and surrounding said shaft end is a gasket seal 52 which is held in place by an L-shape flange 53 on the adjacent region of the diaphragm piston to prevent leakage past the pressure plate 40.

In operating this hydraulically actuated clutch assembly it will be understood that, when the valve assembly V is in the full-line position shown in Fig. 1, pressure fluid from pump P will enter bore 25 of transmission driven shaft 24 and will be discharged from the forward end thereof into chamber 47 of the flywheel assembly X where the force of such fluid flexes the diaphragm piston rearwardly thereby urging pressure plate 40 in a direction to compress the yieldable lips 19 of the driven disc sufficiently to frictionally engage the facing member 10 on said disc between the back-plate 38 and said pressure plate, thus transmitting torque from the engine crank shaft 60 through the quill or sleeve shaft 22 to the gearing of the particular speed ratio to which said shaft 22 is drivingly connected. When the valve body of valve assembly V is shifted to the dotted-line position, the pressure fluid becomes inoperative on the clutch members for the reason that pressure fluid from pump P is then being passed through the opened evacuating outlet 31 and dumped back into the sump. The spring lips 19 of the clutch driven disc are then effective to force the pressure plate 40 away from the facing members 10 to disengage the driving members from the driven clutch disc and at the same time to center said disc between said clutch driving members with the friction facings out of contact therewith.

While this invention has been shown and described in a typical or preferred embodiment thereof, it will be apparent to persons skilled in the art, after understanding the improvements which are contemplated herein, that various changes and modifications may be made therein according to the requirements of each particular installation without departing from the spirit or scope thereof. It is therefore aimed in the appended claims to cover all such changes and modifications.

What is claimed is:

1. In a clutch assembly, a self-centering clutch driven plate adapted for engagement between axially spaced driving clutch members and comprising a hub; a disc carried by said hub and defined by a sheet metal plate having generally radial slots therein dividing the outer region of said disc into a plurality of circumferentially spaced segments; friction facing members secured to opposite sides of the outer region of said disc and adapted to be engaged between driving members of the clutch assembly; and circumferentially extending elongate lips in each segment and extending in opposite directions at each side of certain slots, said lips having therein outwardly extending arcuate regions between their ends with the intermediate portion of the arcuate regions protruding axially beyond the plane of the proximate friction facing member for engagement respectively with said driving clutch members, both ends of each lip being disposed within the planes of said friction members, and said friction facing members on said disc having recesses therein for accommodating the adjacent lips, said arcuate regions of the lips being effective to center said clutch driven plate between the clutch driving members by contact therewith, thereby maintaining said friction facing members out of contact with the driving clutch members during disengagement of the clutch assembly.

2. In a clutch assembly, a self-centering clutch driven plate, adapted for engagement between axially spaced driving clutch members, and comprising a hub; a disc carried by said hub and defined by a sheet metal plate; friction facing members secured to opposite sides of the outer region of said disc; and circumferentially extending elongate lips formed in said disc adjacent the outer periphery thereof, each lip having therein an outwardly extending arcuate region, said arcuate regions of said lips being alternately arranged with their intermediate portions protruding axially beyond the respective planes of the proximate friction facing members, said intermediate portions of the arcuate regions of said lips being engageable respectively with the adjacent surfaces of said driving clutch members to center said clutch driven plate between the clutch driving members during a relative axial movement of one of said members toward the other, said arcuate regions being effective to maintain said friction facing members out of contact with the driving clutch members during disengagement of the clutch assembly.

3. In a clutch assembly, a self-centering clutch driven plate adapted for frictional engagement between spaced driving clutch members defined by a fly wheel and a pressure plate and arranged for relative axial movement, comprising a hub; an annular sheet metal plate defining a central disc carried by said hub, the outer region of said disc divided into circumferentially extending segments by slots extending radially inward from the outer periphery of the disc; friction facing members secured to opposite sides of the outer region of said disc for contact with the driving members of the clutch assembly; and a yieldable lip on each segment extending circumferentially of said disc with two adjacent lips on separate segments extending toward each other and terminating at the same slot, said two last mentioned lips having arcuate regions intermediate their ends and projecting in opposite axial directions beyond the planes of the work surfaces of said friction facing members for direct contact with the respective clutch driving members between which said disc is adapted to be frictionally engaged, and the ends of the lips lying within the planes of said facing members.

4. A driven friction clutch plate adapted to be self-centered between first and second driving clutch members, comprising an annular sheet metal plate defining a central disc, said disc having generally radial slots in its outer region dividing said region into circumferentially extending segments; friction facing members secured one on each side of the outer region of said disc for contact with clutch driving members; and circumferentially extending yieldable lips arranged in pairs with the lips of each pair on proximate segments having free ends terminating at the adjacent slot and pointing in opposite directions towards each other, the lip at one side of said dividing slot having an arcuate region extending beyond the plane of the work surface of the adjacent friction facing member for engaging a first driving clutch member, and the lip at the other side of said dividing slot having a portion extending beyond the plane of the work surface of the other friction facing member for engaging a second driving clutch member, all of said lips having their ends disposed within the planes of said friction facing members, and each friction facing member having a notch therein to clear said lips.

JOHN B. POLOMSKI, Jr.

References Cited in the file of this patent

UNITED STATES PATENTS

| Number | Name | Date |
| --- | --- | --- |
| 1,492,862 | Smith | May 6, 1924 |
| 1,717,534 | Wemp | June 18, 1929 |
| 1,810,360 | Loeffler | June 16, 1931 |
| 2,036,005 | Wemp | Mar. 31, 1936 |
| 2,257,877 | Binder | Oct. 7, 1941 |
| 2,379,024 | Thelander | June 26, 1945 |

FOREIGN PATENTS

| Number | Country | Date |
| --- | --- | --- |
| 254,896 | Switzerland | Jan. 3, 1949 |
| 814,318 | France | June 21, 1937 |